(12) United States Patent
Kowada

(10) Patent No.: US 8,347,610 B2
(45) Date of Patent: Jan. 8, 2013

(54) EXHAUST EMISSION CONTROL DEVICE

(75) Inventor: Minoru Kowada, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 347 days.

(21) Appl. No.: 12/525,689

(22) PCT Filed: Feb. 21, 2008

(86) PCT No.: PCT/JP2008/000296
§ 371 (c)(1),
(2), (4) Date: Aug. 4, 2009

(87) PCT Pub. No.: WO2008/102560
PCT Pub. Date: Aug. 28, 2008

(65) Prior Publication Data
US 2009/0313979 A1    Dec. 24, 2009

(30) Foreign Application Priority Data
Feb. 23, 2007  (JP) ................................ 2007-043492

(51) Int. Cl.
*F01N 3/035* (2006.01)
(52) U.S. Cl. .............................. 60/295; 60/297; 60/317
(58) Field of Classification Search ............ 60/295–297, 60/301, 317, 303
See application file for complete search history.

(56) References Cited

U.S. PATENT DOCUMENTS

| | | | | |
|---|---|---|---|---|
| 6,312,650 B1 * | 11/2001 | Frederiksen et al. | ......... | 422/180 |
| 2003/0110763 A1 * | 6/2003 | Pawson et al. | ................. | 60/286 |
| 2007/0101703 A1 | 5/2007 | Kanaya et al. | | |

FOREIGN PATENT DOCUMENTS

| | | | |
|---|---|---|---|
| DE | 4203807 A1 | * | 8/1993 |
| EP | 1 262 644 A2 | | 12/2002 |
| EP | 1 262 644 A3 | | 12/2002 |
| EP | 1 691 045 A1 | | 8/2006 |
| EP | 1 728 984 A2 | | 12/2006 |

(Continued)

OTHER PUBLICATIONS

U.S. Appl. No. 12/994,381, filed Nov. 23, 2010, Kowada.

(Continued)

*Primary Examiner* — Thomas Denion
*Assistant Examiner* — Jonathan Matthias
(74) *Attorney, Agent, or Firm* — Oblon, Spivak, McClelland, Maier & Neustadt, L.L.P.

(57) ABSTRACT

An exhaust emission control device has a particulate filter 5 and a selective reduction catalyst 6 arranged side by side. An S-shaped communication passage 9 is arranged for introduction of exhaust gas 3 from a rear end of the filter 5 to a front end of the adjacent catalyst 6 in a forward fold-back manner and with a urea water addition injector 11 arranged midway of the passage 9. In order to satisfactorily disperse the urea water with enhanced mixing with the exhaust gas 3 even if the flow rate is increased, slits 12 are formed in circumferentially spaced positions on a rear end of a mixing pipe 9B constituting an upstream portion of the communication passage 9 so as to introduce the exhaust gas 3. A downstream end 9a of a gas gathering chamber 9A is connected to the rear end of the mixing pipe 9B such that the slits 12 are encased and the rear end of the mixing pipe 9B is closed.

9 Claims, 5 Drawing Sheets

FOREIGN PATENT DOCUMENTS

| | | |
|---|---|---|
| EP | 1 728 984 A3 | 12/2006 |
| JP | 2004 108221 | 4/2004 |
| JP | 2005 155404 | 6/2005 |
| JP | 2006 29233 | 2/2006 |
| JP | 2006 183508 | 7/2006 |
| JP | 2006 200497 | 8/2006 |
| JP | 2007 40149 | 2/2007 |
| JP | 2007 40224 | 2/2007 |
| WO | WO 03/025356 A1 | 3/2003 |

OTHER PUBLICATIONS

U.S. Appl. No. 12/677,957, filed Mar. 12, 2010, Kowada, et al.
U.S. Appl. No. 12/679,677, filed Mar. 24, 2010, Kowada.
U.S. Appl. No. 12/738,994, filed Apr. 21, 2010, Kowada.
U.S. Appl. No. 12/742,321, filed May 11, 2010, Kowada, et al.
U.S. Appl. No. 12/524,889, filed Jul. 29, 2009, Kowada.
U.S. Appl. No. 12/529,024, filed Aug. 28, 2009, Endo, et al.

* cited by examiner

EXHAUST EMISSION CONTROL DEVICE

TECHNICAL FIELD

The present invention relates to an exhaust emission control device.

BACKGROUND ART

It has been recently proposed that a particulate filter to capture particulates in exhaust gas is incorporated in an exhaust pipe, selective reduction catalyst capable of selectively reacting $NO_x$ with ammonia even in the presence of oxygen being arranged downstream of the particulate filter, urea water as reducing agent being added between the selective reduction catalyst and the particulate filter, thereby attaining reduction of both the particulates and $NO_x$.

In this case, the addition of the urea water to the selective reduction catalyst is conducted between the particulate filter and the selective reduction catalyst. Thus, in order to ensure sufficient reaction time for thermal decomposition of the urea water added to the exhaust gas into ammonia and carbon dioxide gas, it is necessary to prolong a distance between an added position of the urea water and the selective reduction catalyst. However, such arrangement of the particulate filter and the selective reduction catalyst substantially spaced apart from each other will extremely impair the mountability on a vehicle.

In order to overcome this, the inventor invented a compact, exhaust emission control device as shown in FIGS. 1 and 2 and already filed a Japanese patent application directed to the device for which Japanese patent application No. 2007-29923 was allotted. In an exhaust emission control device of the prior application, incorporated in an exhaust pipe 4 through which exhaust gas 3 flows from a diesel engine 1 via an exhaust manifold 2 is a particulate filter 5 housed in a casing 7 to capture particulates in the exhaust gas 3; arranged downstream of and in parallel with the particulate filter and housed in a casing 8 is selective reduction catalyst having a property capable of selectively reacting $NO_x$ with ammonia even in the presence of oxygen. A rear end of the particulate filter 5 is connected to an front end of the selective reduction catalyst 6 through an S-shaped communication passage 9 such that the exhaust gas 3 discharged through the rear end of the particulate filter 5 is passed through forward turnabout into the front end of the neighboring selective reduction catalyst 6.

As shown in FIG. 2 which shows important parts in enlarged scale, the communication passage 9 is the S-shaped structure comprising a gas gathering chamber 9A which encircles the rear end of the particulate filter 5 to gather the exhaust gas 3 through substantially perpendicular turnabout of the gas just discharged from the rear end of the particulate filter by collision of the gas against a wall surface of the gathering chamber, a mixing pipe 9B which extracts forward the exhaust gas 3 gathered by the chamber 9A and which is provided with a urea water addition injector 11 (urea water addition means) midway of the mixing pipe and a gas dispersing chamber 9C which encircles the front end of the selective reduction catalyst 6 such that, through substantially perpendicular turnabout and dispersion of the gas 3 guided forward by the mixing pipe 9B by collision of the gas against a wall surface of the dispersing chamber, the dispersed exhaust gas 3 is introduced into the front end of the selective reduction catalyst 6.

Arranged in front of the particulate filter 5 in the casing 7 is oxidation catalyst 14 for oxidization treatment of unburned fuel in the exhaust gas 3, and arranged behind the selective reduction catalyst 6 in the casing 8 is ammonia reducing catalyst 15 for oxidization treatment of surplus ammonia.

With the exhaust emission control device thus constructed, the particulates in the exhaust gas 3 are captured by the particulate filter 5. Midway of the mixing pipe 9B downstream of the filter, the urea water is added to the exhaust gas 3 by the injector 11 and is thermally decomposed into ammonia and carbon dioxide gas. On the selective reduction catalyst 6, $NO_x$ in the exhaust gas 3 is satisfactorily reduced by the ammonia. As a result, both the particulates and $NO_x$ in the exhaust gas 3 are reduced.

In this case, the exhaust gas 3 from the rear end of the particulate filter 5 is introduced into the front end of the adjacent selective reduction catalyst 6 through the forward fold-back or directed communication passage 9, which ensures a long distance between an added position of the urea water midway of the communication passage 9 and the selective reduction catalyst 6 and facilitates mixing of the urea water with the exhaust gas 3 due to fold-back of and thus turbulence of the exhaust gas flow, resulting in ensuring sufficient reaction time for production of ammonia from the urea water Moreover, the particulate filter 5 and the selective reduction catalyst 6 are arranged in parallel with each other and the communication passage 9 is arranged along and between the filter 5 and the catalyst 6, so that the whole structure becomes compact in size to substantially improve the mountability on a vehicle.

As a prior art literature pertinent to the invention, there is, for example, the following Patent Literature 1.

[Patent Literature 1] JP 2005-155404A

SUMMARY OF INVENTIONS

Technical Problems

However, where the addition of the urea water to the selective reduction catalyst 6 is conducted between the particulate filter 5 and the catalyst 6 as illustrated in FIGS. 1 and 2 and mentioned in the above, the mixing pipe 9B is provided midway with a boss 10 branching slantingly to upstream side. Fitted from outside of the mixing pipe 9B into the boss 10 is a urea water addition injector 11. With the injector 11 protected so as not to be directly exposed to the flow of the hot exhaust gas 3, urea water is added so that, where the exhaust gas 3 has increased flow rate as shown in FIG. 3, the urea water added by the injector 11 is forced by the vigorous flow of the exhaust gas 3 to be biased along an inner wall of the mixing pipe 9B, disadvantageously failing in sufficient dispersion of the urea water.

The invention was made in view of the above and has its object to make it possible to sufficiently disperse urea water with enhanced mixing with the exhaust gas in a compact, exhaust emission control device comprising a particulate filter and selective reduction catalyst arranged side by side.

Solution to Problems

The invention is directed to an exhaust emission control device comprising a particulate filter incorporated in an exhaust pipe for capturing particulates in exhaust gas, selective reduction catalyst arranged in parallel with and downstream of said particulate filter for selectively reacting $NO_x$ with ammonia even in the presence of oxygen, an S-shaped communication passage for introduction of the exhaust gas from a rear end of the particulate filter to a front end of the adjacent selective reduction catalyst in a forward fold-back manner and urea water addition means arranged midway of said communication passage for addition of urea water, characterized in that an upstream portion of said communication passage comprises a gas gathering chamber for encompassing the rear end of the particulate filter to gather the exhaust gas discharged from the rear end of the particulate filter through substantially perpendicular turnabout of the exhaust gas and a mixing pipe for extracting forward the exhaust gas gathered by the gathering chamber, openings formed in circumferentially spaced positions on a rear end of said mixing pipe for introduction of the exhaust gas, a downstream end of said gathering chamber being connected to the rear end of said mixing pipe such that said respective openings are encased and the rear end of said mixing pipe is closed.

Thus, in this manner, the exhaust gas from the rear end of the particulate filter is gathered by the gas gathering chamber through substantially perpendicular turnabout and introduced into the mixing pipe via the openings on the rear end of the mixing pipe in the dispersed manner, so that the exhaust gas in said mixing pipe becomes turbulent, resulting in sufficient dispersion of the urea water.

In this respect, the more the flow rate of the exhaust gas is increased, the more the turbulence of the exhaust gas in the mixing pipe is facilitated; thus, even if the flow rate of the exhaust gas is increased, the urea water is kept in highly mixed state with the exhaust gas.

The addition of the urea water may be conducted either upstream or downstream of a position where the exhaust gas becomes turbulent. In either of the cases, turbulence of the exhaust gas flow facilitates the dispersion of the urea water.

In the invention, partitions may be arranged between the rear end of the mixing pipe and the downstream end of the gas gathering chamber encircling said rear end of the mixing pipe so as to guide the exhaust gas into one-way swirling around the rear end of the mixing pipe; alternatively, scroll may be shaped between the rear end of the mixing pipe and the downstream end of the gas gathering chamber encircling said rear end of the mixing pipe so as to guide the exhaust gas into one-way swirling around the rear end of the mixing pipe.

Thus, the exhaust gas is guided into one-way swirling around the rear end of the mixing pipe, so that formation of the swirling flow of the exhaust gas guided via the respective openings into the mixing pipe is facilitated, thereby enhancing the mixing of the urea water with the exhaust gas in the mixing pipe.

Moreover, in the invention, a guide vane may be provided for each of the openings so as to guide the exhaust gas into the mixing pipe with further swirling force being added to the exhaust gas swirling in one direction around the rear end of the mixing pipe. Then, swirling is further facilitated by the exhaust gas guided via the respective openings into the mixing pipe, thereby further enhancing the mixing of the urea water with the exhaust gas in the mixing pipe.

Furthermore, it is preferable in the invention to adjust the respective openings on the rear end of the mixing pipe so as to have areas gradually increased from upstream side to downstream side of the exhaust gas flowing around the rear end of the mixing pipe. Thus, biased inflow of the exhaust gas via upstream openings with relatively high pressure and with higher flow rate is redressed so that introduction of the exhaust gas via each of the whole circumferential openings is averaged as much as possible.

Advantageous Effects of Invention

An exhaust emission control device of the invention mentioned above can have a variety of excellent effects and advantages mentioned below.

(I) According to the invention, the exhaust gas from the rear end of the particulate filter is gathered by the gas gathering chamber through substantially perpendicular turnabout, and is introduced into the mixing pipe in the dispersed manner via the openings arranged in circumferentially spaced positions on the rear end of the mixing pipe, so that the exhaust gas in the mixing pipe becomes turbulent to satisfactorily disperse the urea water. As a result, even if the exhaust gas has increased flow rate, the urea water can be satisfactorily dispersed to enhance the mixing thereof with the exhaust gas.

(II) According to the invention, the exhaust gas can be guided into one-way swirling around the rear end of the mixing pipe, so that swirling of the exhaust gas introduced via the respective openings into the mixing pipe can be facilitated, thereby further effectively enhancing the mixing of the urea water with the exhaust gas in the mixing pipe.

(III) According to the invention, guide vanes may be provided to further add the swirling force to the exhaust gas flowing in one-way swirling around the rear end of the mixing pipe to be guided into the mixing pipe. As a result, swirling of the exhaust gas guided via the respective openings into the mixing pipe is further facilitated to further enhance the mixing of the urea water with the exhaust gas in the mixing pipe.

(IV) According to the invention, biased introduction of the exhaust gas into the mixing pipe through upstream openings with relatively high pressure and with higher flow rate can be redressed to average the introduction of the exhaust gas into each of the whole circumferential openings as much as possible.

Figure 1:
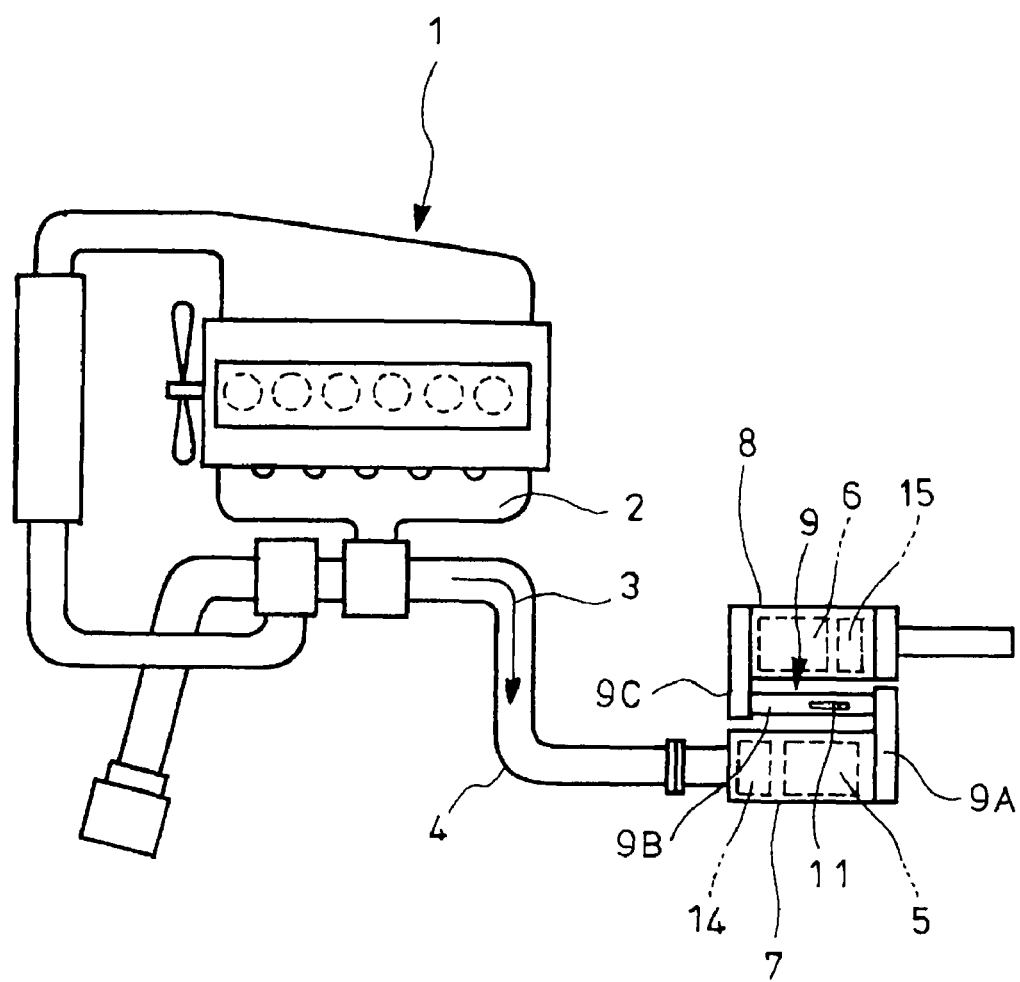
FIG. 1 is a schematic view showing a conventional device.

REFERENCE SIGNS LIST 3 exhaust gas
4 exhaust pipe
5 particulate filter
6 selective reduction catalyst
9 communication passage
9A gas gathering chamber
9a downstream end
9B mixing pipe
11 urea water addition injector (urea water addition means)
12 slit (opening)
16 partition
17 guide vane
18 space

DESCRIPTION OF EMBODIMENTS

Embodiments of the invention will be described in conjunction with the drawings.

Figure 2:
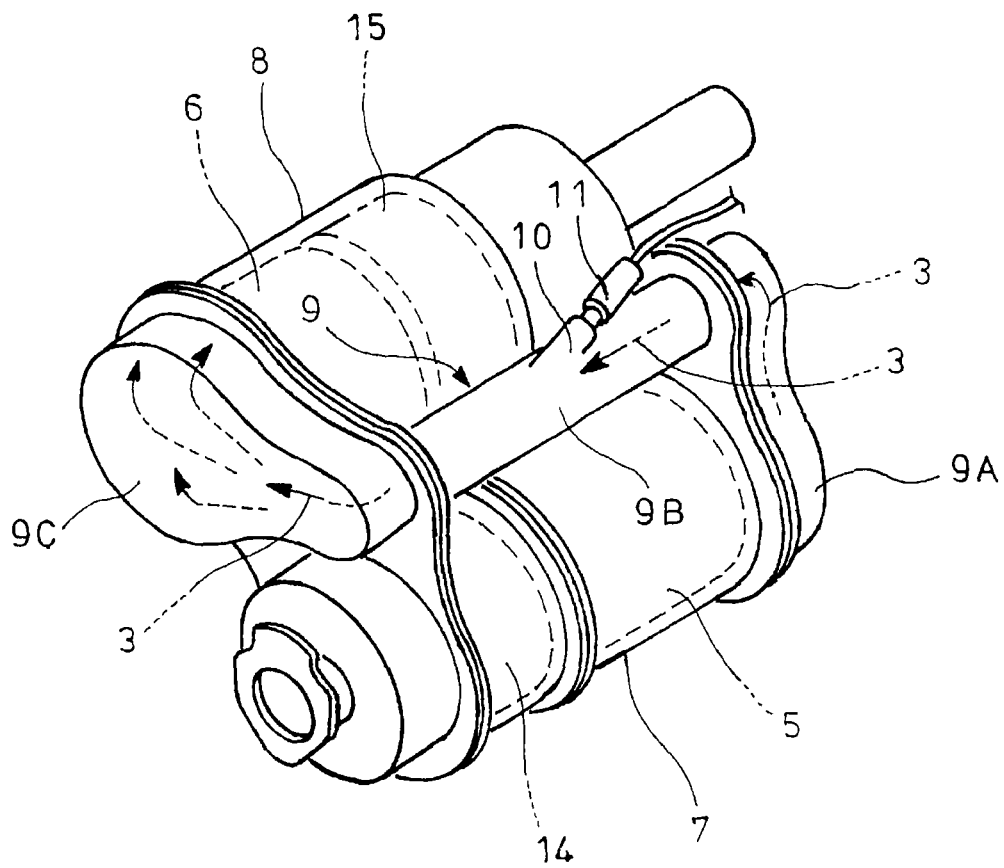
FIG. 2 is a perspective view showing important parts of FIG. 1 in enlarged scale.
Figure 3:
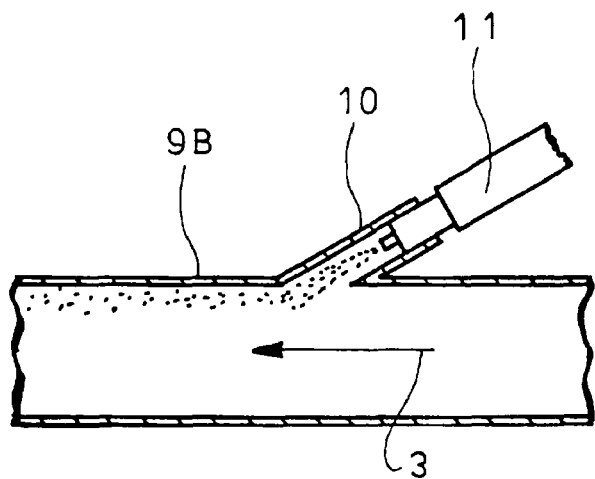
FIG. 3 is a sectional view for explanation of a problem in conventional urea water addition.
Figure 4:
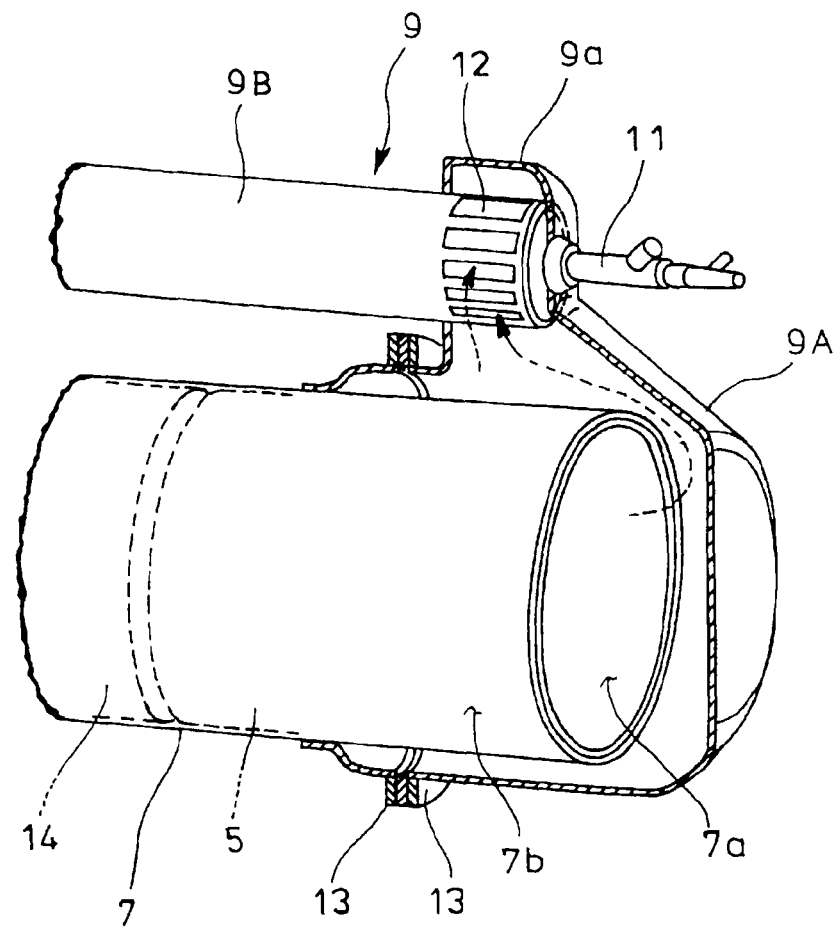
FIG. 4 is a partly cutout perspective view showing an embodiment of the invention.
Figure 5:
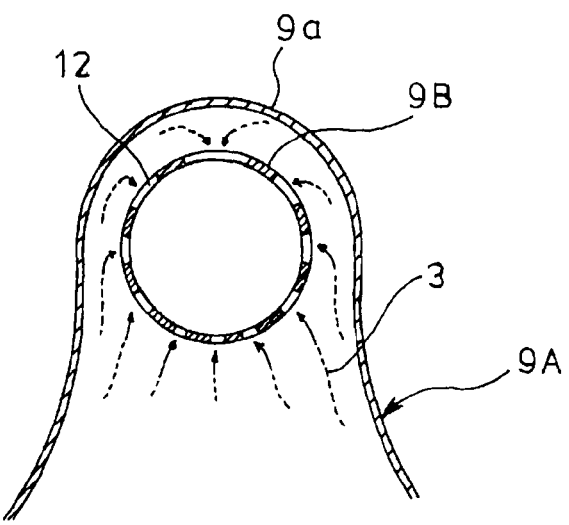
FIG. 5 is a sectional view showing important parts of FIG. 4 in enlarged scale.

FIGS. 4 and 5 show an embodiment of the invention which is directed to an exhaust emission control device constructed substantially similar to that shown in FIGS. 1 and 2 mentioned in the above, a gas gathering chamber 9A and a mixing pipe 9B constituting an upstream portion of the communication passage 9 being changed as mentioned below.

Specifically, in the embodiment illustrated, slits 12 (openings) are formed in circumferentially spaced positions on a rear end of a mixing pipe 9B so as to introduce exhaust gas 3, a downstream end 9a of a gas gathering chamber 9A being connected to the rear end of the mixing pipe 9B such that the respective slits 12 are encased and the rear end of the mixing pipe 9B is closed.

The respective slits 12 on the rear end of the mixing pipe 9B are adjusted to have openings with areas gradually increased from upstream side to downstream side of the exhaust gas 3 flowing around the rear end of mixing pipe, so that biased introduction of the exhaust gas 3 into the mixing pipe 9B through upstream slits 12 with relatively high pressure and with higher flow is redressed.

Urea water addition injector 11 as urea water addition means is coaxially fitted to the rear end of the mixing pipe 9B closed by the downstream end 9a of the gas gathering chamber 9A, so that the urea water is added by the injector 11 centrally into the rear end of the mixing pipe 9B.

The gas gathering chamber 9A encases an outlet of a casing 7, which carries particulate filter 5, in a required spaced apart relationship to an open end 7a and an outer periphery 7b of the outlet of the casing 7, and is divided into segments at a position upstream of the open end 7a of the outlet of the casing 7, the segments being detachably connected together through flanges 13.

Thus, in such construction, the exhaust gas 3 from the rear end of the particulate filter 5 is gathered by gas gathering chamber 9A through substantially perpendicular turnabout, and is introduced into the mixing pipe 9B through slits 12 formed in circumferentially spaced positions on the rear end of the mixing pipe 9B in the dispersed manner, so that the exhaust gas 3 in the mixing pipe 9B becomes turbulent. Urea water is added by the injector 11 to a central position of the rear end of the mixing pipe 9B where the turbulence is most violent, so that the added urea water is satisfactorily dispersed in the exhaust gas 3.

The turbulence of the exhaust gas 3 in the mixing pipe 9B is facilitated as the flow rate of the exhaust gas 3 is increased, so that highly mixed state of the urea water with the exhaust gas 3 can be kept even if the flow rate of the exhaust gas 3 is increased.

Thus, according to the above embodiment, the exhaust gas 3 from the rear end of the particulate filter 5 is gathered by the gas gathering chamber 9A through substantially perpendicular turnabout and is introduced into the mixing pipe 9B through the slits 12 in circumferentially spaced positions on the rear end of the mixing pipe 9B in the dispersed manner, so that the exhaust gas 3 in the mixing pipe 9B becomes turbulent to satisfactorily disperse the urea water. As a result, even if the flow rate of the exhaust gas 3 is increased, the urea water can be satisfactorily dispersed to enhance the mixing with the exhaust gas 3.

Figure 6:
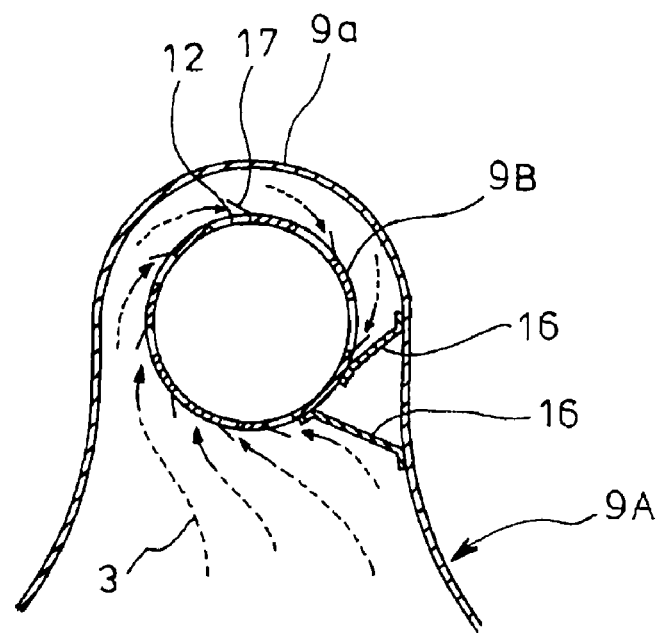
FIG. 6 is a sectional view showing a further embodiment of the invention.

FIG. 6 shows a further embodiment of the invention in which partitions 16 are arranged between the rear end of the mixing pipe 9B and the downstream end 9a of the gas gathering chamber 9A encircling the rear end of the mixing pipe so as to guide the exhaust gas 3 in one-way swirling around the rear end of the mixing pipe 9B. Moreover, a guide vane 17 is arranged for each of the slits 12 so as to guide into the mixing pipe 9B the exhaust gas 3 swirling in one-way around the rear end of the mixing pipe 9B with further swirling force being added thereto.

Figure 7:
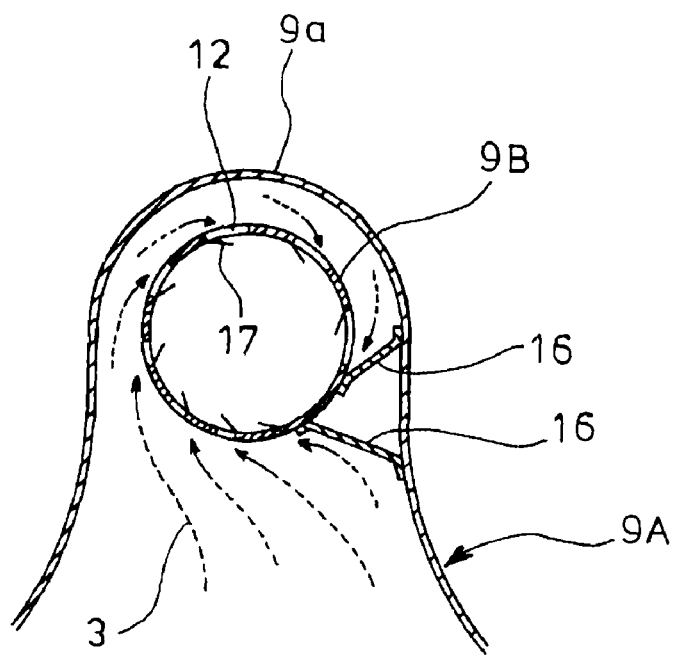
FIG. 7 is a sectional view showing a variation of the guide vanes.

In the embodiment illustrated in FIG. 6, the guide vanes 17 are shown being provided at each of downstream ends of the slits 12 in the swirling direction guided by the partitions 16 to project outward of the mixing pipe 9B with riding gradient upstream; alternatively, as shown in FIG. 7, the guide vanes 17 may be provided at each of the downstream ends of the slits 12 in the swirling direction guided by the partitions 16 to project inward of the mixing pipe 9B with falling gradient downstream.

Figure 8:
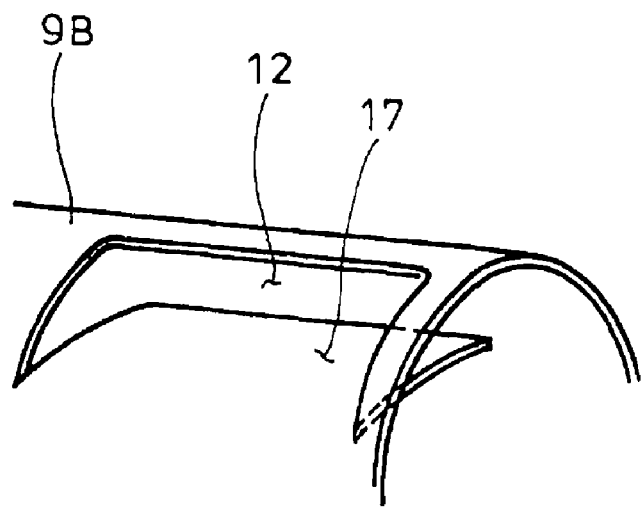
FIG. 8 is a sectional view showing an example of how to make guide vanes.

As shown in FIG. 8, this kind of guide vanes 17 may be provided integrally and coincidentally with formation of the slits 12 by cutting in the rear end of the mixing pipe 9B and pushing down the cut-in parts (FIG. 8 shows a example of pushing down the cut-in part inward); alternatively, though not shown, the guide vanes 17 may be fabricated as separate parts to be attached to the respective slits 12 through for example welding.

Thus, in this manner, the flow of the exhaust gas 3 is guided by the partitions 16 into one-way swirling around the rear end of the mixing pipe 9B and further swirling force is added to the guided flow of the exhaust gas 3 by the respective guide vanes 17, so that swirling of the exhaust gas 3 guided by the respective slits 12 into the mixing pipe 9B is remarkably facilitated to further effectively enhance the mixing of the urea water with the exhaust gas 3 in the mixing pipe 9B.

Figure 9:
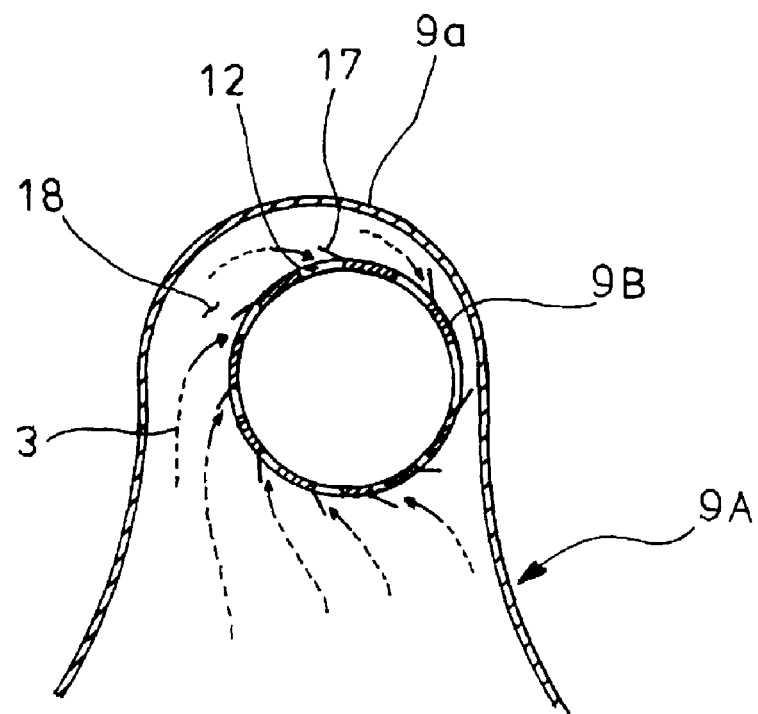
FIG. 9 is a sectional view showing a still further embodiment of the invention

FIG. 9 shows a still further embodiment of the invention in which in lieu of the partitions 16 in the above FIG. 6 embodiment, a scroll is formed in space 18 between the rear end of the mixing pipe 9B and the downstream end 9a of the gas gathering chamber 9A encircling the rear end of the mixing pipe so as to guide the exhaust gas 3 into one-way swirling around the rear end of the mixing pipe 9B.

Also in this case, the flow of the exhaust gas 3 is guided into one-way swirling around the rear end of the mixing pipe 9B by the scroll shape, so that effects and advantages can be obtained which are similar to those in the above FIG. 6 embodiment.

In either of the embodiments of FIGS. 6 and 9, it is preferable that the respective slits 12 are adjusted to have the openings with areas gradually increased from upstream side to downstream side of the exhaust gas 3 swirling in one way therearound. Then, biased inflow of the exhaust gas 3 into the mixing pipe 9B through upstream slits 12 with relatively high pressure and with higher flow rate can be redressed to average the introduction of the exhaust gas 3 into each of the whole circumferential slits 12 as much as possible.

It is to be understood that an exhaust emission control device of the invention is not limited to the above embodiments and that various changes and modifications may be made without departing from the scope of the invention. For example, the added position of the urea water is not limited to that shown and openings such as round ones other than the slits may be applicable.

The invention claimed is:

1. An exhaust emission control device comprising
a particulate filter incorporated in an exhaust pipe for capturing particulates in exhaust gas,
selective reduction catalyst arranged in parallel with and downstream of said particulate filter for selectively reacting $NO_x$ with ammonia even in the presence of oxygen,
an S-shaped communication passage arranged between and along the particulate filter and selective reduction catalyst for connecting a rear end of the particulate filter to a front end of the selective reduction catalyst, so as to introduce the exhaust gas from the rear end of the particulate filter to a front end of the adjacent selective reduction catalyst in a forward fold-back manner and urea water addition means arranged midway of said communication passage for addition of urea water, wherein an upstream portion of said communication passage comprises a gas gathering chamber for encompassing the rear end of the particulate filter to gather the exhaust gas discharged from the rear end of the particulate filter through substantially perpendicular turnabout of the exhaust gas and a mixing pipe for extracting forward the exhaust gas gathered by the gathering chamber, openings formed in circumferentially spaced positions on a rear end of said mixing pipe for introduction of the exhaust gas, a downstream end of said gathering chamber being connected to the rear end of said mixing pipe such that said respective openings are encased and the rear end of said mixing pipe is closed, wherein partitions are arranged between the rear end of the mixing pipe and the downstream end of the gas gathering chamber encircling said rear end of the mixing pipe so as to guide the exhaust gas into a one-way swirling flow around the rear end of the mixing pipe, and wherein the urea water is added to where the swirling flow is formed.

2. An exhaust emission control device as claimed in claim 1, wherein a guide vane is arranged for each of the openings so as to introduce into the mixing pipe the exhaust gas swirling in one way around the rear end of the mixing pipe with further swirling force added thereto.

3. An exhaust emission control device as claimed in claim 2, characterized in that the respective openings on the rear end of the mixing pipe are adjusted to have areas gradually increased from upstream side to downstream side of the exhaust gas flowing therearound.

4. An exhaust emission control device as claimed in claim 1, characterized in that the respective openings on the rear end of the mixing pipe are adjusted to have areas gradually increased from upstream side to downstream side of the exhaust gas flowing therearound.

5. An exhaust emission control device as claimed in claim 1, characterized in that the respective openings on the rear end of the mixing pipe are adjusted to have areas gradually increased from upstream side to downstream side of the exhaust gas flowing therearound.

6. An exhaust emission control device comprising
a particulate filter incorporated in an exhaust pipe for capturing particulates in exhaust gas,
selective reduction catalyst arranged in parallel with and downstream of said particulate filter for selectively reacting $NO_x$ with ammonia even in the presence of oxygen, an S-shaped communication passage arranged between and along the particulate filter and selective reduction catalyst for connecting a rear end of the particulate filter to a front end of the selective reduction catalyst, so as to introduce the exhaust gas from the rear end of the particulate filter to a front end of the adjacent selective reduction catalyst in a forward fold-back manner and urea water addition means arranged midway of said communication passage for addition of urea water, wherein an upstream portion of said communication passage comprises a gas gathering chamber for encompassing the rear end of the particulate filter to gather the exhaust gas discharged from the rear end of the particulate filter through substantially perpendicular turnabout of the exhaust gas and a mixing pipe for extracting forward the exhaust gas gathered by the gathering chamber, openings formed in circumferentially spaced positions on a rear end of said mixing pipe for introduction of the exhaust gas, a downstream end of said gathering chamber being connected to the rear end of said mixing pipe such that said respective openings are encased and the rear end of said mixing pipe is closed, wherein a scroll is formed in space between the rear end of the mixing pipe and the downstream end of the gas gathering chamber encircling said rear end of the mixing pipe so as to guide the exhaust gas into a one-way swirling flow around the rear end of the mixing pipe, and wherein the urea water is added to where the swirling flow is formed.

7. An exhaust emission control device as claimed in claim 6, wherein a guide vane is arranged for each of the openings so as to introduce into the mixing pipe the exhaust gas swirling in one way around the rear end of the mixing pipe with further swirling force added thereto.

8. An exhaust emission control device as claimed in claim 7, characterized in that the respective openings on the rear end of the mixing pipe are adjusted to have areas gradually increased from upstream side to downstream side of the exhaust gas flowing therearound.

9. An exhaust emission control device as claimed in claim 6, characterized in that the respective openings on the rear end of the mixing pipe are adjusted to have areas gradually increased from upstream side to downstream side of the exhaust gas flowing therearound.

* * * * *